United States Patent [19]
Palmberg

[11] 3,720,829
[45] March 13, 1973

[54] SAMPLE FRACTURING APPARATUS

[75] Inventor: Paul W. Palmberg, Minneapolis, Minn.

[73] Assignee: Physical Electronics Industries, Inc., Edina, Minn.

[22] Filed: Feb. 28, 1972

[21] Appl. No.: 229,744

[52] U.S. Cl. .....................250/49.5 B, 250/49.5 A
[51] Int. Cl................................................H01j 37/20
[58] Field of Search ...................250/49.5 B, 49.5 A

[56] References Cited

OTHER PUBLICATIONS

"Cryofracture of Biological Material," Haggis, Scanning Electron Microscopy Conference, IIT Research Inst., Chicago, Ill., April '70.

Primary Examiner—James W. Lawrence
Assistant Examiner—C. E. Church
Attorney—Everett J. Schroeder et al.

[57] ABSTRACT

A sample fracturing apparatus especially adapted for use in a high vacuum enclosure for the preparation of samples in performing surface chemistry analysis on fresh surfaces of the same is disclosed. The same fracturing apparatus is a mechanical linkage system operating through the walls of an enclosure and sealed therein to pivot a breaker member with respect to a sample being held in a portion of the breaker member to effectively snap the sample and provide a clean surface upon which analysis can be made. Suitable cooling of the samples is effected by transmitting the flow of a cooling medium through the sample holder via tube lines sealed within the fracturing frame.

11 Claims, 4 Drawing Figures

SAMPLE FRACTURING APPARATUS

My invention relates to sample fracturing apparatus and more particularly to an improved structure adapted to operate under a vacuum to fracture a sample to present a fresh surface for examination and analysis without destroying the established pressure or vacuum within an enclosure.

Structures for performing analysis, such as surface chemistry, on samples are known and in use. Such structures require the presence of a high vacuum to perform accurate measurements on the samples. Because of the time involved in producing such vacuums within a measuring enclosure, it is desired that a plurality of measurements on a plurality of samples take place without destruction of the vacuum to meet the requirements of rapid industrial control analysis and make such structures economical for use. Further, such structures require the handling of a sample to present a surface upon which measurements are to be made which is uncontaminated. Up to the present time there has been no equipment of this type available which could perform measurements on a plurality of samples under such conditions.

The present invention is directed to a simplified sample fracturing apparatus for use in high vacuum environments. It provides a mechanical structure adapted to receive a plurality of samples in sequence and to fracture the same such as to present a clean fractured surface for examination and analysis. The structure includes a pivoted breaker member operating in conjunction with a sample holding structure to enable the fracture of a sample within a high vacuum chamber without altering the pressure or vacuum characteristics. This is accomplished through the use or movement of a simple mechanical linkage structure through the walls of the vacuum enclosure and includes means for subjecting the sample to an extreme low temperature to facilitate fracture of the same.

It is therefore an object of this invention to provide an improved sample fracturing apparatus for use in high vacuum environments.

Another object of this invention is to provide a simplified mechanical sample fracturing apparatus which will operate through the walls of a high vacuum enclosing structure.

A further object of this invention is to provide a sample fracturing structure which is capable of operation with a carrousel mounting a plurality of samples to fracture the samples selectively and in a sequence.

A still further object of this invention is to provide a simplified structure of this type mechanical in nature which will not affect the integrity of the vacuum enclosure or will contaminate the same.

Another object of this invention is to provide a structure of this type which is easy to use and maintain.

These and other objects of this invention will become apparent from a reading of the attached description together with the drawings wherein.

Figure 1:
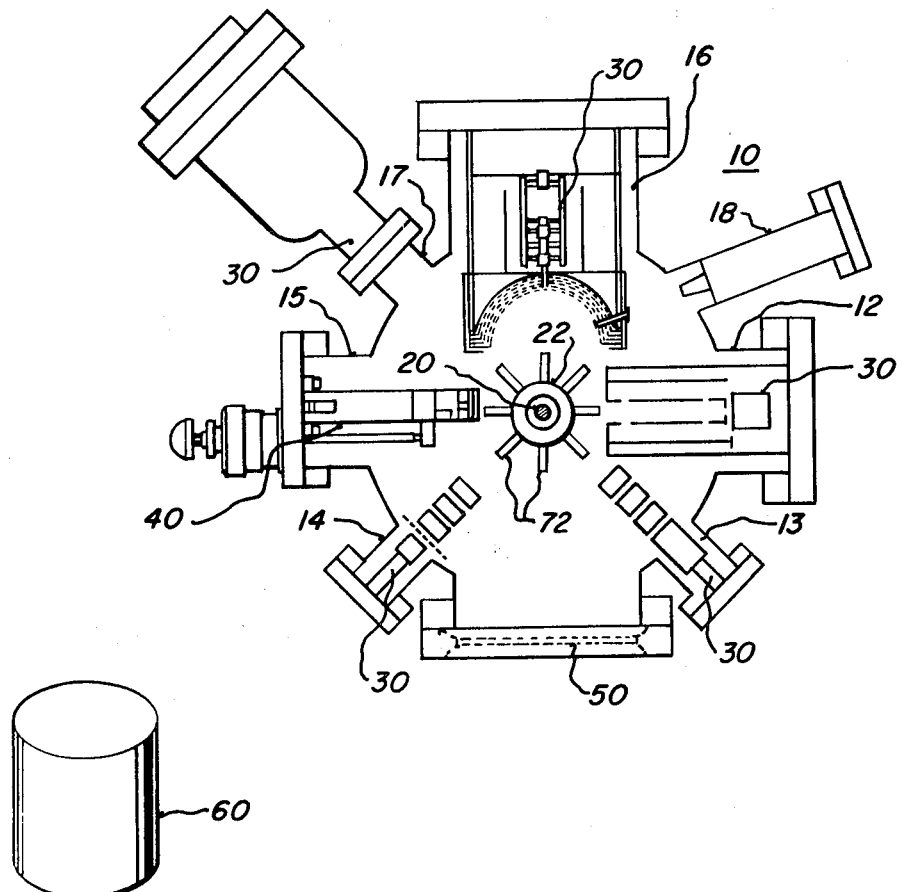
FIG. 1 is a schematic disclosure of a vacuum system employing the improved sample fracturing apparatus of the present invention along with several measuring apparatus.

My improved sample fracturing apparatus is shown schematically in FIG. 1 in connection with a vacuum type enclosure indicated generally at 10. It is a schematic disclosure of a vacuum chamber having a plurality of analyzers and electron guns for bombarding the surface of samples in the analysis of the same. A plurality of ports are positioned around the periphery of the vacuum chamber, such as is indicated at 12, 13, 14, 15, 16 and 17, with a suitable evacuating system as evidenced by the passage or pipe 18 extending therefrom. Positioned through the top of the machine is a shaft like structure 20 mounting a carrousel or sample support 22 at the extremity of the same, the shaft being adapted to be slidably raised and lowered within the enclosure without violating the vacuum integrity of the same and rotated through suitable sealing apparatus. A plurality of analyzers of varying types, indicated generally at 30, are positioned in certain of the ports and adapted to be aligned with samples held by the carrousel for the purpose of performing analysis or measurements on the same through the bombarding of the exposed surface of the sample with electrons or ions of a particular nature for the purpose of determining the identity of materials in the sample. Included with one of the ports is a sample fracturing structure, indicated generally at 40, by means of which a portion of the sample may be sheared off or broken off to present a clean uncontaminated surface for the purpose of conducting measurements thereon. Also included in the enclosure is a viewing port 50 by means of which the operator may align the carrousel 22 with the samples thereon with any one of the analysis apparatus in the remaining ports.

The nature of the analysis equipment may vary depending upon the types of investigations to be conducted on the materials of the samples. These details form no part of the present invention and are consequently disclosed herein only schematically with broad reference to the same. The sample fracturing structure which cooperates with the carrousel 22 will be best seen in FIG. 2. As indicated therein, the shaft structure 20 is mounted through a particular linkage system, indicated generally at 60, which would permit elevation of the shaft and rotation of the same within the confines of the enclosure through manipulation of a handle extremity (not shown) outside of the enclosure without violating the vacuum integrity of the same to permit movement of the shaft 20 and hence the carrousel or sample mounting structure 22 carried at the end of the shaft for the purpose of manipulating the samples therein. As disclosed in FIG. 2, the samples 70 are a plurality of rod like structures which are mounted in spoke holders 72 formed as an integral part of the carrousel with the rod like samples being held therein through suitable screw means 73. In order to manipulate the samples with respect to the analysis or measuring and bombarding apparatus positioned in the ports of the enclosure, it is necessary to provide the shaft and hence the carrousel with at least two degrees of movement one being an elevation of the shaft along its longitudinal axis and one rotation of the shaft with respect to its longitudinal axis.

Figure 2:
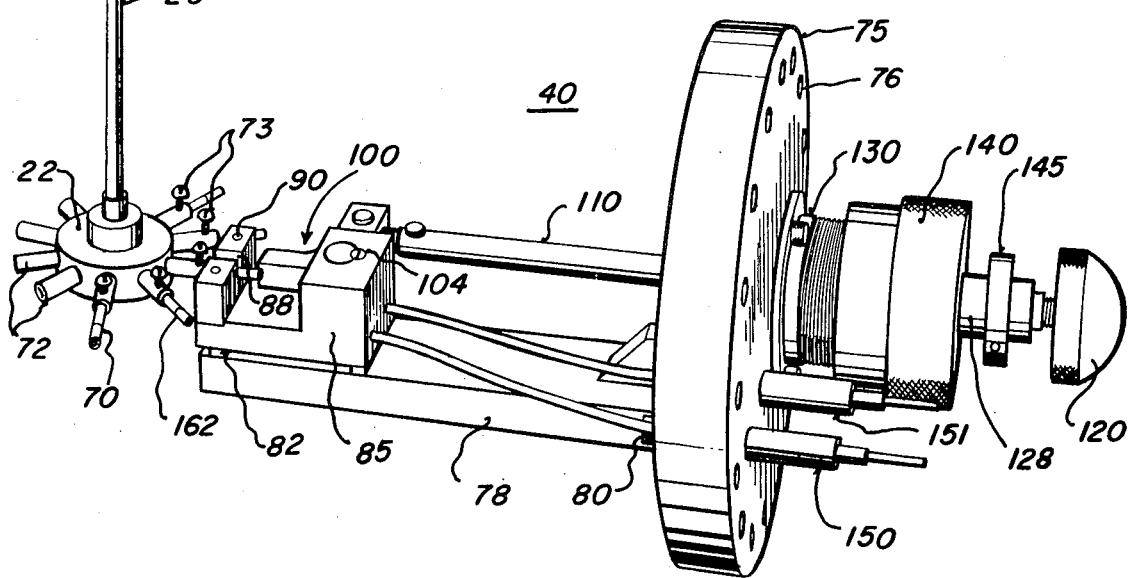
FIG. 2 is a perspective view of the sample fracturing apparatus and a carrousel mounting a plurality of samples for the same.
Figure 3:
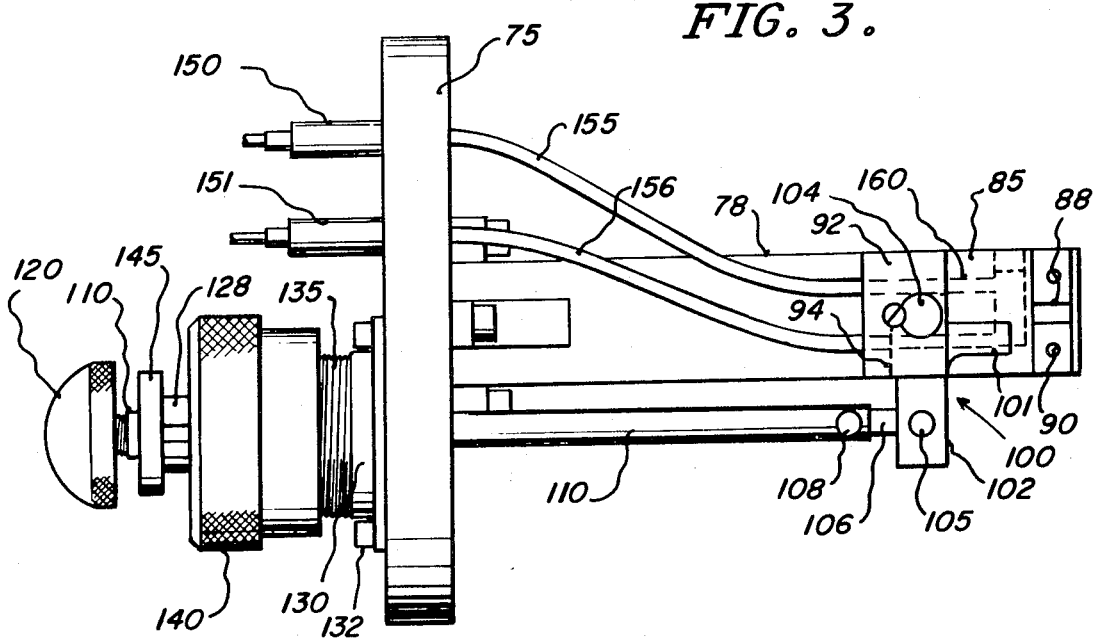
FIG. 3 is a plan view of the sample fracturing apparatus of FIG. 2.
Figure 4:
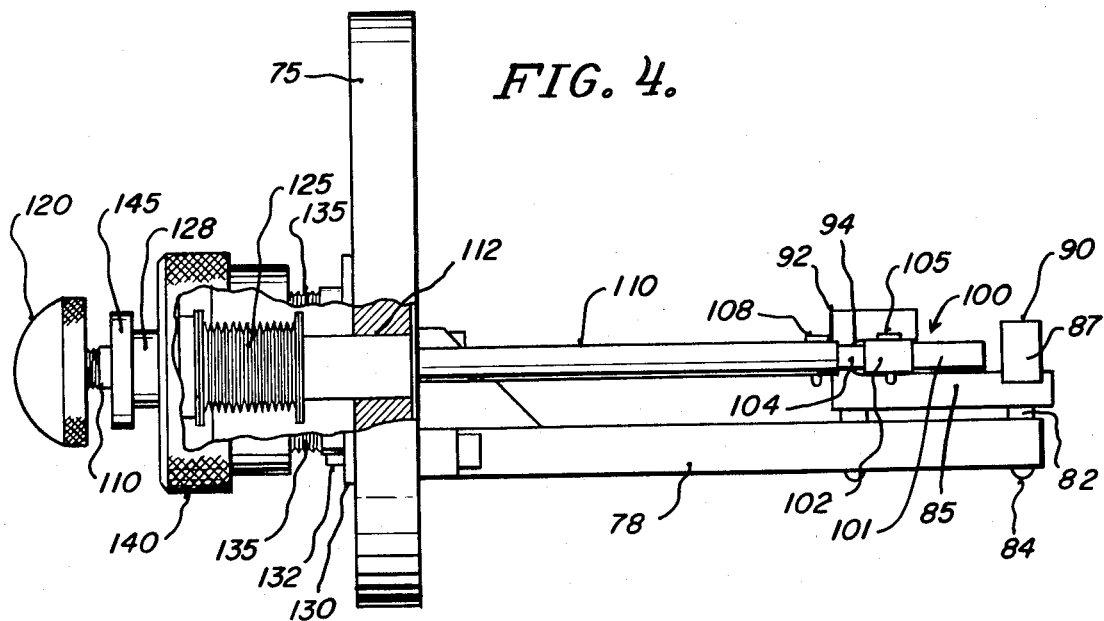
FIG. 4 is a side elevation view of the sample fracturing apparatus of FIG. 2 with parts broken away.

The sample breaker structure 40 includes a cylindrical flange part 75 adapted to be fitted over one of the ports, such as 15 in the enclosure 10, to mount the sample breaker structure 40 in the enclosure and seal the same therein. The cylindrical flange has a plurality of apertures 76 therethrough by means of which the flange may be bolted to the enclosure and a suitable gasket (not shown) is included between the port and the flange to seal the same. Attached to the flange is a translationally extending mounting plate 78 or part which is secured to the flange 75 through suitable bolt means 80. The two parts form a base structure for the sample breaker which is mounted in the enclosure such that the mounting plate extends radially within the enclosure to a position adjacent the location of the carrousel 22 and the samples 70 mounted therein. As will be best seen in FIGS. 2, 3 and 4, the mounting plate 78 mounts at the free extremity of the same a breaker mounting block 85 which is spaced from the end of the mounting plate 78 by means of spacer members 82 with the mounting block being secured thereto through suitable bolt means 84 extending through apertures in the spacer member and mounting plate and cooperating with tapped apertures (not shown) in the mounting block 85. The breaker mounting block has a sample holder or sample holding block 87 mounted in the extremity of the same with the latter having a slot 88 positioned therethrough in the upper surface thereof. The block 87 is secured to the breaker mounting block through bolt means, such as is indicated at 90. The opposite extremity of the breaker mounting block includes a raised portion 92 formed integral therewith, the raised portion having a slot 94 therein which mounts an L shaped breaker member 100. The breaker member is formed of two legs with an enlarged apex having a journaling aperture therethrough adapted to receive a pivot pin 104 extending through an aperture in the raised portion 92 of the block and the apex of the breaker member to pivotally mount the L shaped breaker member with the mounting block. One leg 101 of the L shaped breaker member extends from the raised portion 92 of the mounting block toward the sample holder 87 to be disposed to one side of the slot 88 therein. The other leg of the L shaped breaker member, as indicated by 102, has an aperture therein into which a linkage member 106 extends with the linkage member being pinned in the L shaped member through a suitable pin 105. The linkage member in turn is pinned to an elongated shaft 110 through a pin member 108 with the shaft extending back through the flange 75, as best seen in FIGS. 3 and 4 to an operating handle 120. This end of the shaft is sealed in the flange member by means of a bellows adaptor 112 (see FIG. 4) which is sealed in a suitable aperture in the flange to pass the shaft 110 therethrough. A bellows 125 is attached to the adaptor 112 with the opposite end of the bellows 125 being connected to a second adaptor 128 which seals the shaft 110 at this end of the bellows member. This entire structure is mounted within an enclosing structure defined by a flange member 130 which is mounted on the outside of the cylindrical flange 75 through screws 132 and with the body of the cylindrical flange being threaded as at 135. A cylindrical or cup shaped cap member 140 having an internal threaded surface is threaded on the surface 135 of the flange 130 to secure the same therein with the outer end of the cup shaped member being connected to the adaptor member 128 to rigidly mount the same therein. Thus, the adaptor member 128 is coupled through the cap 140 and cylindrical flange 130 to the plate or cylindrical mounting flange 75 of the sample fracturing structure with the adaptor member 128 having a passage therethrough journaling the shaft 110 beyond the seal at the end of the bellows 125. The adaptor member 128 beyond the cap 140 mounts a stop-ring 145 with the shaft 110 extending therethrough and mounting the operating handle or knob 120 at the free extremity of the same. Thus the shaft may be moved longitudinally along its axis by manually pushing on the knob 120 with the shaft 110 being guided in the adaptor member 128 which is supported on the cylindrical flange 75 through the cap 140 and cylindrical flange 130. The bellows 125 will collapse with movement of the shaft inwardly and will provide a seal around the shaft 110 to insure the integrity of the vacuum seal of the enclosure 10. Inward movement of the shaft will cause forward or pivotal movement of the leg extremity 102 of the L shaped breaker member 100 causing the same to pivot in the slot 94 of the breaker mounting block 85 causing the opposite leg 101 to move relative to the slot 88 in the sample holder 87 for the purpose of engaging the projecting portion of a sample 70, as best seen in FIG. 2, for the purpose of fracturing the same.

Also positioned through the flange 75 of the base structure are a pair of standoff pipes 150, 151 which are sealed therein and connect to pipes 155, 156, respectively extending to the breaker mounting block 85 as will be best seen in FIG. 3. Within the breaker mounting block are passages indicated in phantom at 160 which provide a circular flow passage through the block 85 and between the pipes 155, 156 to provide for a circulating flow through the standoff pipes 150, 151 of a cooling medium. This cooling medium which may be a cryogenic fluid, such as liquid nitrogen, will effectively cool the breaker mounting block 85 and the sample holder 87 mounted thereon along with the breaker member 100. With the introduction of a sample 70 into the slot 88 of the sample holder 87, the sample is also cooled due to the good heat conducting relationship between the breaker mounting block 85 and the sample holder 87 causing a drop in temperature of the sample. As each of the samples are mounted in the carrousel, they are suitably scored, such as is indicated by the notch 162, in the sample 70 to define a break line therein. The cooling medium effectively drops the temperature of the breaker mounting block and hence the sample mounted thereon to an extreme low level facilitating fracturing of the sample with movement of the breaker member 100. There is no clamp for the sample within the sample holder 87 but rather a reasonably tight fit will be provided such that with translational movement of the leg 101 of the sample breaker into contact with the extremity of the sample beyond the slot 88, fracture will take place along the score line 162 to insure a clean and uncontaminated surface of the sample.

As each sample 70 is fractured with this apparatus, it will present the clean surface so that as the carrousel 22 is lifted upwardly by movement of the shaft 20, the sample will be moved out of the slot 88 and then rotated due to rotation of the shaft carrying the carrousel 22 into proximity with one of the analyzing apparatus 30 or ion guns in adjacent ports within the enclosure. These may be at a slightly different level in the enclosure 10 than the sample breaker 40 so as not to have additional samples mounted in the carrousel interfer with the sample holder 87 until it is desired to break a sample. The viewing port 50 within the enclosure 10 allows for the operator to elevate the shaft 20 and hence the carrousel 22 with respect to the sample holder 87 and to rotate the same with respect to the ports in which are positioned the various analyzing equipment 30 for performing analysis of a surface chemical nature on the samples. The fracturing of the samples effected by the improved sample fracturing apparatus is purely mechanical and no parts of the same disposed within the enclosure contain materials other than metal so that no gas or other contaminates will be given off into the presence of the vacuum. The cooling passage within the breaker mounting block 85 and through the base structure or the flange 75 sealed in the enclosure 10 permits the reduction of temperature of the sample to facilitate fracture of the same. It will be readily recognized that a plurality of samples 70 may be mounted in the carrousel 22 and selectively the surfaces of the same fractured by placing the sample in the slot 88 of the sample holder 87 and operating the pivoted breaker member 100 through movement of the shaft 110 by manual movement of the knob 120. The carrousel 22 with the samples therein may then be rotated with respect to any of the ports of the enclosure to have analysis performed on the fractured sample.

In considering this disclosure it should be noted that the same is intended to be illustrative only and the scope of the invention should be determined by the appended claims.

What is claimed is:

1. In combination, an enclosure structure defining a sealed vacuum chamber, an articulated shaft supported in the enclosing structure and adapted to be rotated and transversely displaced within the enclosing structure, a sample holding carrousel mounted on the end of the shaft within the enclosing structure, a sample fracturing apparatus including a base structure positioned through the walls of the enclosing structure and extending adjacent the sample holding carrousel, said fracturing apparatus including a sample holder mounted on the base structure adjacent the carrousel and including a slot therein, a pivoted breaker member mounted on the base structure adjacent the sample holder and adapted to be pivoted translationally with respect to the slot therein to fracture a sample positioned in the slot and in the path of pivotal movement of the breaker member, means extending through the enclosing structure and connected to the pivoted breaker member being sealed to the enclosing structure for pivoting the breaker member in the fracturing of the sample, and means positioned in the enclosing structure and extending therein for performing an analysis on the fractured sample.

2. The combination of claim 1 in which the means extending through the enclosure and connected to the breaker member is a shaft slidably mounted through the enclosing structure and including bellows means for sealing the same to provide for longitudinal movement to pivot breaker member in the fracturing operation.

3. The combination of claim 2 in which the base structure includes a flange member adapted to be sealed into the enclosing structure and a frame member extending therefrom and connected thereto and terminating adjacent said carrousel.

4. The combination of claim 3 in which the sample holder and the breaker member are mounted on the frame member remote from the sealed flange member.

5. The combination of claim 4 and including conduit means extending through said flange member and to said breaker member and said sample holder to direct the flow of a cooling medium to said members.

6. The combination of claim 5 in which the frame member includes a breaker mounting block positioned thereon and spaced therefrom which is mounted at the end of the frame member and in turn mounts the sample holder at one end of the same and the breaker member at the opposite end of the same with the breaker member taking the form of an L shaped flange pivoted at the apex of the flange with one edge being directed toward the sample holder and the other edge extending transversely to the mounting block and being connected to the shaft extending through the sealed flange member.

7. The combination of claim 6 in which the breaker mounting block includes a circulating passage therein connected to the conduit means to provide for the flow of the cooling medium through the breaker mounting block.

8. The combination of claim 7 and including means extending through the enclosing structure and adapted to evacuate the enclosure therein.

9. A sample fracturing apparatus comprising, an enclosing structure defining a sealed chamber, a passage means therethrough for evacuating said chamber, means positioned within said chamber and adapted to hold a plurality of cylindrical shaped samples, means connected to said last named means for elevating and rotating said means to orient the samples in various locations within said enclosing structure, a sample fracturing apparatus including a base structure positioned through said enclosing structure and extending adjacent to said sample holding means, said fracturing apparatus including a sample holder adapted to receive an end of the sample mounted in said sample mounting means and to hold the same for fracturing, a pivoted sample breaker member mounted on said base structure adjacent said sample holder and adapted to be pivoted translationally with respect to the sample holder and the sample therein to fracture the sample held in said sample holder through pivotal movement of said breaker member, means extending through said enclosure and connected to said pivoted breaker member to operate the breaker member for pivotal movement in the fracturing of a sample, and means at least partially within said enclosing structure for performing an analysis on the fractured sample.

10. The sample fracturing apparatus of claim 9 in which the means extending through the enclosure and connected to the sample breaker member is a shaft adapted to be moved along the axial extent of the same and including bellow means positioned in said base structure to seal the shaft for movement.

11. The sample fracturing apparatus of claim 10 and including means extending through the enclosure and connected to the sample breaker member and the sample holder in heat conducting relation therewith to cool the sample held by the sample holder before fracturing.

* * * * *

UNITED STATES PATENT OFFICE
CERTIFICATE OF CORRECTION

Patent No. 3,720,829                    Dated March 13, 1973

Inventor(s) Paul W. Palmberg

It is certified that error appears in the above-identified patent and that said Letters Patent are hereby corrected as shown below:

Under Section entitled "Abstract", line 4, after

"The" delete "same" and insert the following - "sample"-

Signed and sealed this 10th day of July 1973.

(SEAL)
Attest:

EDWARD M.FLETCHER,JR.                   Rene Tegtmeyer
Attesting Officer                       Acting Commissioner of Patents